(12) United States Patent
Cawiezel et al.

(10) Patent No.: US 9,102,860 B2
(45) Date of Patent: Aug. 11, 2015

(54) METHOD OF INHIBITING OR CONTROLLING RELEASE OF WELL TREATMENT AGENT

(75) Inventors: Kay E. Cawiezel, Fullshear, TX (US); D. V. Satyanarayana Gupta, The Woodlands, TX (US)

(73) Assignee: Baker Hughes Incorporated, Houston, TX (US)

(*) Notice: Subject to any disclaimer, the term of this patent is extended or adjusted under 35 U.S.C. 154(b) by 393 days.

(21) Appl. No.: 13/162,461

(22) Filed: Jun. 16, 2011

(65) Prior Publication Data

US 2012/0318515 A1  Dec. 20, 2012

(51) Int. Cl.
C09K 8/52 (2006.01)
C09K 8/28 (2006.01)
C09K 8/035 (2006.01)
C09K 8/36 (2006.01)
C09K 8/60 (2006.01)

(52) U.S. Cl.
CPC . *C09K 8/28* (2013.01); *C09K 8/035* (2013.01); *C09K 8/36* (2013.01); *C09K 8/52* (2013.01); *C09K 8/602* (2013.01); *C09K 2208/24* (2013.01)

(58) Field of Classification Search
None
See application file for complete search history.

(56) References Cited

U.S. PATENT DOCUMENTS

| | | | |
|---|---|---|---|
| 5,067,566 A | 11/1991 | Dawson | |
| 5,591,700 A * | 1/1997 | Harris et al. | 507/214 |
| 5,603,942 A | 2/1997 | Narayanan et al. | |
| 5,806,597 A | 9/1998 | Tjon-Joe-Pin et al. | |
| 5,996,692 A * | 12/1999 | Chan et al. | 166/263 |
| 6,090,399 A * | 7/2000 | Ghosh et al. | 424/409 |
| 6,613,720 B1 * | 9/2003 | Feraud et al. | 507/200 |
| 7,188,676 B2 | 3/2007 | Qu et al. | |
| 7,205,264 B2 | 4/2007 | Boles | |
| 7,231,976 B2 | 6/2007 | Berry et al. | |
| 7,380,606 B2 | 6/2008 | Pursley et al. | |
| 7,392,844 B2 | 7/2008 | Berry et al. | |
| 7,392,845 B2 | 7/2008 | Berry et al. | |
| 7,455,111 B2 | 11/2008 | Qu et al. | |
| 7,475,730 B2 | 1/2009 | Brown et al. | |
| 7,481,273 B2 | 1/2009 | Javora et al. | |
| 7,491,682 B2 | 2/2009 | Gupta et al. | |
| 7,493,955 B2 | 2/2009 | Gupta et al. | |
| 7,906,464 B2 * | 3/2011 | Davidson | 507/235 |
| 2002/0055439 A1 | 5/2002 | Palmer et al. | |
| 2002/0125010 A1 * | 9/2002 | Collins et al. | 166/279 |
| 2002/0132740 A1 * | 9/2002 | Von Krosigk et al. | 507/200 |

(Continued)

FOREIGN PATENT DOCUMENTS

| | | |
|---|---|---|
| EP | 0328292 | 8/1989 |
| WO | 01/42387 A1 | 6/2001 |
| WO | 2008/080093 A2 | 7/2008 |

OTHER PUBLICATIONS

The Pharmaceutics and Compounding Laboratory; Emulsions: Preparation and Stabilization; Retrieved from http://pharmlabs.unc.edu/labs/emulsions/hlb.htm; pp. 1-2.*

*Primary Examiner* — Angela M DiTrani
*Assistant Examiner* — Anuradha Ahuja
(74) *Attorney, Agent, or Firm* — John Wilson Jones; Jones & Smith, LLP

(57) ABSTRACT

A microemulsion delivery system containing a well treatment agent in a water-in-oil microemulsion may be used for well remediation as well as in other treatment operations including stimulation, acidizing, and drilling. In addition, the water-in-oil microemulsion delivery system may be used to clean surface equipment and downhole equipment.

18 Claims, 6 Drawing Sheets

(56) References Cited

U.S. PATENT DOCUMENTS

| | | |
|---|---|---|
| 2003/0106690 A1* | 6/2003 | Boney et al. .................. 166/280 |
| 2003/0166472 A1* | 9/2003 | Pursley et al. ................ 507/200 |
| 2004/0063795 A1* | 4/2004 | VonKrosigk et al. ............ 516/38 |
| 2006/0166835 A1* | 7/2006 | Yang et al. .................... 507/200 |
| 2007/0135310 A1* | 6/2007 | Qu et al. ......................... 507/90 |
| 2007/0265171 A1* | 11/2007 | Javora et al. ..................... 507/90 |
| 2008/0217012 A1 | 9/2008 | Delorey et al. |
| 2008/0241041 A1* | 10/2008 | Clothier et al. ............... 423/263 |
| 2008/0255247 A1* | 10/2008 | Sagalowicz et al. .......... 514/772 |
| 2008/0287324 A1* | 11/2008 | Pursley et al. ................ 507/218 |
| 2009/0114247 A1 | 5/2009 | Brown et al. |
| 2009/0120642 A1* | 5/2009 | Eoff et al. .................. 166/280.2 |
| 2009/0131285 A1* | 5/2009 | Wang et al. .................... 507/252 |
| 2009/0137432 A1* | 5/2009 | Sullivan et al. ............... 507/219 |
| 2009/0200027 A1* | 8/2009 | Kakadjian et al. .......... 166/270.1 |
| 2009/0325825 A1 | 12/2009 | Gupta et al. |
| 2010/0081587 A1* | 4/2010 | van Zanten et al. .......... 507/235 |
| 2010/0152069 A1* | 6/2010 | Harris ........................... 507/201 |
| 2013/0244913 A1* | 9/2013 | Maberry et al. .............. 507/261 |

* cited by examiner

METHOD OF INHIBITING OR CONTROLLING RELEASE OF WELL TREATMENT AGENT

FIELD OF THE INVENTION

The invention relates to a method of inhibiting or controlling the rate of release of a well treatment agent in a subterranean formation, an oil well, a gas well, a geothermal well, a flow conduit or vessel by introducing into the formation, well, flow conduit or vessel a microemulsion containing the well treatment agent.

BACKGROUND OF THE INVENTION

In the treatment of oil, gas and geothermal wells and/or subterranean formations penetrated by wells, it is important that well treatment agents be delivered into defined targeted areas. Well fluids are generally complex mixtures of aliphatic hydrocarbons, aromatics, hetero-atomic molecules, anionic and cationic salts, acids, sands, silts, clays and a vast array of other components. The nature of these fluids, combined with the severe conditions of heat, pressure, and turbulence to which they are often subjected, are contributory factors to the formation and deposition of contaminants, such as scales, salts, paraffins, corrosion, bacteria and asphaltenes in production wells.

A common site for the formation and deposition of such contaminants in oil or gas wells is the annular space between the production tubing and casing. The annulus may be a static area or may produce gas or liquid. The formation and deposition of such contaminants may reduce well productivity. Further, the presence of contaminants, such as scales, in the annulus may make it difficult or impossible to remove the tubing for servicing.

In addition, such contaminants form in other equipment and flow conduits used in the production of oil, gas and other fluids. Acute problems result when such contaminants develop in equipment and flow conduits used in gas and oil production, refineries and other fluid processing facilities.

Well treatment agents are known in the art for inhibiting or controlling such unwanted contaminants. In some instances, it is necessary for well treatment agents to be released into their targeted area over a sustained period of time. For instance, it is typically desired that well treatment agents which inhibit the formation or deposition of contaminants such as scales, salts, paraffins, corrosion, bacteria and asphaltenes be slowly released in production wells, subterranean formations, equipment and flow conduits used in gas production and oil production. The formation and deposition of such unwanted contaminants decrease permeability of the formation and reduce well productivity and can completely block the well tubular in severe cases.

U.S. Pat. No. 7,491,682 and U.S. Pat. No. 7,493,955, both of which are herein incorporated by reference, disclose the use of composites for the slow release of well treatment agents. U.S. Pat. No. 7,475,730 and U.S. Patent Publication No. 20090114247, both of which also herein incorporated by reference, further disclose a method of inhibiting and/or removing unwanted contaminants from wells, flow conduits and vessels with a foamed treatment composition.

In well service operations, such as drilling operations, hydraulic fracturing operations and completion operations, it is often important that the activity of the well treatment agent be delayed for some time after being introduced into the well and/or subterranean producing formation. For example, in hydraulic fracturing, the viscosity of the fracturing fluid is typically decreased after placement of proppant into the fracture in order that the fluid may flow naturally from the formation. While breakers are typically incorporated into the fracturing fluid, their activity is most desirably delayed until after the proppant is placed into the fracture. Further, it is often desirable to delay crosslinking in a fracturing fluid until after the fluid has traveled to a designated distance into the wellbore and/or through the formation. At that point, gelling of the fluid is desired.

Breakers are also used to break down filter cakes which are formed during wellbore operations. For instance, breakers are often included in the drilling fluid to break down filter cakes. It is desirable, however, that the breaker not be functional until break down of the filter cake is needed.

While composites have been successful in the slow release of well treatment agents in drilling, stimulation and completion operations, methods of improving the slow or delayed release of well treatment agents, especially liquid well treatment agents, as well as improved methods for delivering such treatment agents into wells, formations, conduits and/or vessels have been sought. In particular, alternatives have been sought for delivering well treatment agents into targeted areas such that the well treatment agent may be slowly released and the activity of the treatment agent may be delayed.

SUMMARY OF THE INVENTION

A microemulsion having an incorporated well treatment agent provides for the slow and controlled release of the well treatment agent in a well, subterranean formation penetrated by a well, flow conduit, or vessel. Release of the well treatment agent into the well, formation, flow conduit, or vessel may be delayed until the time that the effect imparted by the well treatment agent is needed.

Thus in one embodiment, a well treatment agent may be slowly and continuously released into a targeted area in a gas well, oil well or geothermal well over a sustained period of time when incorporated into an emulsion.

In another embodiment, the well treatment agent may be slowly and continuously released into a targeted area of a subterranean formation over a sustained period of time when incorporated into a microemulsion.

In another embodiment, the well treatment agent may be slowly and continuously released into a targeted area of a flow conduit or vessel over a sustained period of time when incorporated into a microemulsion.

In another embodiment, the microemulsion in which the well treatment agent is incorporated may be a solvent-surfactant blend added to an aqueous diluent. The solvent-surfactant blend may, optionally, contain an alcohol.

Exemplary solvents include terpenes, exemplary surfactants include those having a hydrophilic-lipophilic balance (HLB) between from about 3 to about 8, and exemplary diluents include water as well as mixtures of water and triethylene glycol.

The oil phase of the microemulsion may be diesel, kerosene, crude oil, a linear-α-olefin, poly-α-olefin, or other synthetic oils.

The well treatment agent may include enzyme breakers, oxidative breakers, breaker catalysts, crosslinkers, buffers, paraffin inhibitors, asphaltene inhibitors, scale inhibitors, pH adjustment agents, oxidizers, crosslinking agents, crosslinking delaying agents, demulsifying agents, acids, and esters.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
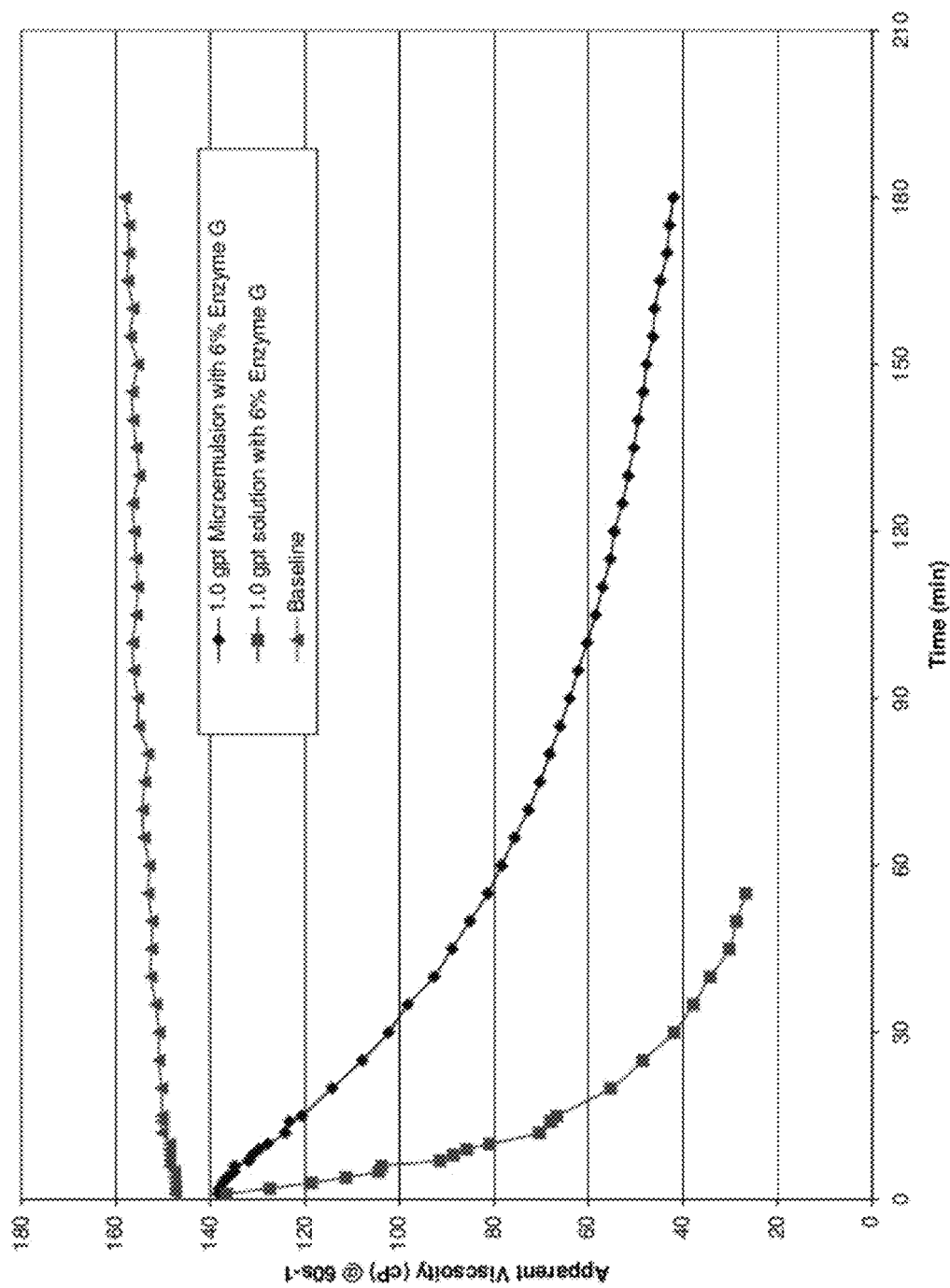
FIG. 1 compares the apparent viscosity at 75° F. of a linear gel having 6% by volume enzyme incorporated in a water-in-oil microemulsion versus a linear gel having 6% by volume enzyme within an aqueous fluid.

A well treatment agent may remain inactive in a well, subterranean formation penetrated by a well, as well as flow conduits and vessels used in the production of oil and/or gas as well as refineries by incorporating the well treatment agent into a microemulsion. The delayed release of the well treatment agent from the microemulsion at a generally constant rate may extend over a period of time, in some cases exceeding three years. Typically, the well treatment agent is released from the microemulsion by increased temperatures and solubility changes of the well treatment agent over time.

The well treatment microemulsions are thermally stable and may be formed by the combination of solvent-surfactant blends with an oil-based fluid. The oil phase forms the continuous or discontinuous phase of the microemulsion. The microemulsion may be considered as small-scale versions of emulsions, i.e., droplet type dispersions either of oil-in-water or water-in-oil with an average particulate size ranges in the order of about 5 to about 50 nm in drop radius. In emulsions, the average drop size grows continuously with time so that phase separation ultimately occurs. The drops of the emulsion are generally large (>0.1 microns) and often exhibit a milky or cloudy, rather than a translucent, appearance as seen in microemulsions.

Exemplary microemulsions include those set forth in U.S. Pat. No. 5,603,942 and U.S. Patent Publication No. 20080287324, both of which are herein incorporated by reference.

The particle size of the well treatment agent in the microemulsion is normally between from about 0.001 microns to about 100 microns. In some instances, the particle size of the well treatment is less than or equal to 0.05 microns.

The water-in-oil microemulsion may be a solvent-surfactant blend added to an aqueous diluent. The solvent-surfactant blend may, optionally, contain an alcohol. The solvent-surfactant blend may include from about 35 to about 80% by volume of surfactant, from about 14% to about 54% by volume solvent and from 0 to about 20% by volume alcohol. The amount of water in the water-in-oil microemulsion is typically no greater than 50 volume percent, preferably no greater than about 30 volume percent. The amount of hydrocarbon in the oil-in-water microemulsion is typically no greater than 50 volume percent, preferably no greater than about 30 volume percent.

In an embodiment, the solvent is selected from the group of unsaturated aliphatic cyclic hydrocarbons known as terpenes, including monoterpenes and diterpenes. In a preferred embodiment, the solvent is the monoterpene d-limonene ($C_{10}H_{16}$). The terpene-based solvent may further be partially or completely replaced with alkyl, cyclic or aryl acid esters of short chain alcohols, such as ethyl lactate and hexyl ester.

The surfactant of the solvent-surfactant blend is one which is capable of creating a water-in-oil microemulsion upon combination with oil. The surfactant may be cationic, anionic, zwitterionic or nonionic. Preferred surfactants are biodegradable and have an HLB value of between about 3-8. Exemplary water-in-oil surfactants include Span® 40 (sorbitan monopalmitate), Span® 60 (sorbitan monostearate), Span® 80 (sorbitan monooleate), linear alcohol alkoxylates, ethoxylated castor oil, and polyethylene glycol. A preferred water-in-oil surfactant mixture includes sorbitan monopalmitate, ethoxylated castor oil and polyethylene glycol.

The alcohol component of the solvent-surfactant blend, when present, may serve as a coupling agent between the solvent and the surfactant and may assist in stabilization of the microemulsion as well as lowering of the freezing point of the microemulsion. Although isopropanol is presently preferred, alternative suitable alcohols include mid-range primary, secondary and tertiary alcohols with between 1 and 20 carbon atoms, such as t-butanol, n-butanol, n-pentanol, n-hexanol and 2-ethyl-hexanol.

Other freeze prevention additives can additionally or alternatively be added, such as detergent range alcohol ethoxylates, ethylene glycols (EG), polyethylene glycols (PEG), propylene glycols (PG) and triethylene glycols (TEG).

The solvent-surfactant blend may also optionally include a salt for stability and co-solvent substitution. Suitable are K, Na, Mg, Zn, Br, Sr, Cs, Li, and Ca salts such as, for example, NaCl, KCl, $CaCl_2$, and $MgCl_2$ are presently preferred.

A diluent is further added to the blend containing the solvent, surfactant and alcohol prior to addition of the oil. Exemplary diluents include water and water and triethylene glycol (TEG) mixtures such as one containing about 90% by volume water and 10% by volume triethylene glycol. Upon addition of the diluent, the solvent-surfactant blend may partially or completely emulsify.

Exemplary solvent-surfactant blends are those containing about 56% by volume of a surfactant mixture of sorbitan monopalmitate, ethoxylated castor oil and polyethylene glycol, about 34% by volume d-limonene and/or ethyl lactate, and about 10% by volume isopropanol.

The oil phase of the microemulsion is preferably diesel, kerosene, crude oil, condensate, an ester, linear-α-olefin, poly-α-olefin, internal olefin, paraffin, linear alkyl benzene, ester, acetal, or other synthetic oils. In a preferred embodiment, diesel or condensate is used as a diluent.

The well treatment microemulsion typically includes from about 0.5% to about 98% of the solvent-surfactant blend.

To the base water-in-oil microemulsion, a water-based well treatment chemical is added with minimal mixing when the well treatment chemical preferentially gets into the water phase of the microemulsion. Similarly, to a base oil-in water microemulsion, a hydrocarbon based well treatment chemical can be added with minimal mixing, when the well treatment chemical gets into the hydrocarbon phase of the microemulsion.

The well treatment agent is added to the microemulsion prior to its introduction into the well. The amount of well treatment agent in the microemulsion is normally from about 2 to 20 weight percent, preferably from about 3 to about 12 weight percent, more preferably from about 4 to about 8 weight percent.

The well treatment agent may include enzyme breakers (including encapsulated enzyme breakers), oxidative breakers (including encapsulated oxidative breakers), breaker catalysts, crosslinking agents, demulsifying agents, crosslinking delay agents, paraffin inhibitors, asphaltene inhibitors, scale inhibitors, corrosion inhibitors, scale inhibitors, gas hydrate inhibitors, pH adjustment agents, oxidizers, foaming agents, oxygen scavengers, biocides, emulsifiers (both water-in-oil and oil-in-water), and surfactants as well as other agents wherein slow release into the well, subterranean formation, flow conduits or vessel is desired.

When the well treatment agent is used to inhibit or control the formation of unwanted deposits or contaminants, the well treatment agent is preferably at least one member selected from the group consisting of demulsifying agents (both water-in-oil and oil-in-water), corrosion inhibitors, scale inhibitors, paraffin inhibitors, gas hydrate inhibitors, salt formation inhibitors and asphaltene dispersants.

Since the aqueous phase containing the well treatment agent is emulsified in the oil phase of the microemulsion and since the microemulsion is thermally stable, only a small amount of well treatment agent is released into the desired area or surface.

The well treatment agent is preferably a liquid material. If the well treatment agent is a solid, it can be dissolved in a suitable solvent, thus making it a liquid.

The microemulsions may be introduced into the wellbore, flow conduits, vessels or surface equipment as a component of a treatment or carrier fluid in order to facilitate placement of the microemulsion to a desired location within the formation. In this regard, any well treatment fluid suitable for transporting the microemulsion may be used. Typically the microemulsion containing the well treatment agent is introduced to the carrier fluid on-the-fly and injected downhole.

Well treatment fluids containing the microemulsion may be gelled or non-gelled. In one embodiment, the microemulsion may be introduced or pumped into a well as neutrally buoyant particles in, for example, a saturated sodium chloride solution fluid or a fluid that is any other completion or workover brine known in the art.

The well treatment fluid may be a brine (such as a saturated potassium chloride or sodium chloride solution), salt water, fresh water, a liquid hydrocarbon, or a gas such as nitrogen or carbon dioxide.

The amount of microemulsion in the treatment fluid is typically between from about 15 ppm to about 100,000 ppm.

The microemulsion may be used to remove deposited contaminants which forms on flow conduits or vessels. For instance, during the production of oil and gas from wells, it is not uncommon for scales, rust, salts, paraffins and asphaltenes to be deposited onto surfaces of flow conduits or vessels. The treatment agent in the microemulsion may be used to inhibit the deposition of such materials and/or remove such deposits upon their formation.

The microemulsion further has applicability in the inhibition and/or removal of contaminants from flow conduits and vessels used in refineries and fluid processing facilities. Thus, in addition to their being used in the treatment of oil and gas wells, the microemulsion finds applicability in refining and chemical industries.

The microemulsion therefore has applicability in the treatment of flow conduits including pipelines and flow lines as well as transmission and process piping including the piping used to connect vessels in chemical treatment plants as well as refineries.

A fluid containing the microemulsion may also be introduced into the wellbore to inhibit or control the formation of undesired contaminants onto tubular surface equipment within the wellbore as well as equipment in a refinery or chemical processing site.

The microemulsions may be effective in the removal of contaminants on metallic as well as non-metallic surfaces. In a preferred embodiment, the treated compositions are used to remove contaminants on metallic surfaces, such as high alloy steels, including chrome steels, duplex steels, stainless steels, martensitic alloy steels, ferritic alloy steels, austenitic stainless steels, precipitation-hardened stainless steels and high nickel content steels.

Further, the microemulsions may be used in well treatment fluids such as fracturing fluids, completion fluids, acidizing fluids, drilling fluids, etc. For instance, when used to inhibit or control the formation of undesired contaminants or when used to retard the release of contaminants in the well, the microemulsion may be introduced into the wellbore as a component of a completion fluid.

In a preferred embodiment, the water-in-oil microemulsions effectively inhibits, controls, removes or prevents the formation of inorganic scale formations being deposited in oil wells, gas wells, water wells, geothermal wells and subterranean formations penetrated by a well. The water-in-oil microemulsions are particularly efficacious in the treatment of scales of calcium, barium, magnesium salts and the like, including barium sulfate, calcium sulfate, and calcium carbonate scales. The water-in-oil microemulsions may further have applicability in the treatment of other inorganic scales, such as zinc sulfide, iron sulfide, etc.

Suitable scale inhibitors are anionic scale inhibitors. Preferred scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof. Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred. Further useful are chelating agents, including diethylenetriaminepentamethylene phosphonic acid and ethylenediaminetetra acetic acid.

The well treatment agent may further be any of the fructans or fructan derivatives, such as inulin and inulin derivatives, as disclosed in U.S. Patent Publication No. 2009/0325825, herein incorporated by reference.

Exemplary of the demulsifying agents that are useful include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Hydrocarbon soluble paraffin inhibitors may include ethylene/vinyl acetate copolymers, acrylates (such as polyacrylate esters and methacrylate esters of fatty alcohols), and olefin/maleic esters.

Exemplary corrosion inhibitors include fatty imidazolines, alkyl pyridines, alkyl pyridine quaternaries, fatty amine quaternaries and phosphate salts of fatty imidazolines.

Gas hydrate treating chemicals or inhibitors may include polymers and homopolymers and copolymers of vinyl pyrrolidone, vinyl caprolactam and amine based hydrate inhibitors such as those disclosed in U.S. Patent Publication Nos. 2006/0223713 and 2009/0325823, both of which are herein incorporated by reference.

Exemplary asphaltene treating chemicals include fatty ester homopolymers and copolymers (such as fatty esters of acrylic and methacrylic acid polymers and copolymers) and sorbitan monooleate.

Suitable foaming agents include oxyalkylated sulfates or ethoxylated alcohol sulfates, or mixtures thereof.

Exemplary surfactants include cationic, amphoteric, anionic and nonionic surfactants. Included as cationic surfactants are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Included as amphoteric surfactants are glycinates, amphoacetates, propionates, betaines and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Exemplary oxygen scavengers include triazines, maleimides, formaldehydes, amines, carboxamides, alkylcarboxylazo compounds cumine-peroxide compounds morpholino and amino derivatives morpholine and piperazine derivatives, amine oxides, alkanolamines, aliphatic and aromatic polyamines.

The microemulsions of the invention do not require excessive amounts of well treatment agents. When used to delay or control the release over a sustained period of time of a well treatment agent useful in the removal, inhibition or control of unwanted contaminants, the amount of well treatment agent in the microemulsions may be as low as 1 ppm. Generally, the amount of well treatment agent in the microemulsion is from about 0.05 to about 5 (preferably from about 0.1 to about 2) weight percent based upon the total weight of the microemulsion.

When placed into a well, the well treatment agent slowly demulsifies from the microemulsion at a generally constant rate over an extended period of time into the water or hydrocarbons which are contained in the formation, well, conduit or vessel. The microemulsion therefore permits a continuous supply of the well treatment agent into the targeted area. Generally, the lifetime of a single treatment using the microemulsion having an incorporated well treatment agent for the removal of unwanted contaminants is between six and twelve months and may be in excess of 3 years.

In well remediation applications, the selected well treatment microemulsion is preferably injected directly into the wellbore through the production tubing or through the use of coiled tubing or similar delivery mechanisms. Once downhole, the well treatment microemulsion remedies drilling damage, fracturing fluid damage, water blocks and removes fines, asphaltenes and paraffins from the formation and wellbore. The well treatment microemulsion also serves to thin heavy hydrocarbons, alleviate water blocks and lower pore pressure in the formation.

Additional amount of fluid containing the well treatment agent may be introduced into the wellbore or formation anytime after the initial charge of well treatment agent in the microemulsion has been at least partially depleted. Typically, the additional well treatment agent is introduced when the well treatment agent has been substantially depleted and the performance level of the well treatment agent in the microemulsion has become unacceptable.

The microemulsion may also be used in stimulation fluids including acidizing fluids, fracturing fluids and fluids used in sand control. For instance, the well treatment agent of the microemulsion may be a crosslinking agent, crosslinking delaying agent or pH control additive which may be released when its activity is desired downhole. For example, since some stimulation fluids are highly viscous, it is sometimes desirable to delay crosslinking until the treatment fluid reaches a targeted destination. In those instances, it is desirable to include the crosslinking agent (or crosslinking delaying agent) as a component of the water-in-oil microemulsion.

Suitable crosslinking agents include a borate ion releasing compound, an organometallic or organic complexed metal ion comprising at least one transition metal or alkaline earth metal ion as well as mixtures thereof. Specific crosslinking agents include borate ion releasing compounds, for example, boric acid, alkali metal borates such as sodium diborate, potassium tetraborate, sodium tetraborate (borax), pentaborates and the like and alkaline and zinc metal borates, organometallic and organic complexed metal compounds, such as those containing zirconium IV ions such as, for example, zirconium lactate, zirconium lactate triethanolamine, zirconium carbonate, zirconium acetylacetonate and zirconium diisopropylamine lactate; titanium IV ions such as, for example, titanium ammonium lactate, titanium triethanolamine, and titanium acetylacetonate.

Suitable crosslinking delay agents may include organic polyols, such as sodium gluconate; sodium glucoheptonate, sorbitol, mannitol, phosphonates, bicarbonate salt, salts, various inorganic and weak organic acids including aminocarboxylic acids and their salts (EDTA, DTPA, etc.) and citric acid and mixtures thereof.

In a particularly preferred embodiment, the well treatment agent is a breaker which is capable of reducing the viscosity of a gelled fluid. For instance, after a fracturing fluid is formed and pumped into a subterranean formation, it is generally desirable to convert the highly viscous gel to a lower viscosity fluid. This allows the fluid to be easily and effectively removed from the formation and to allow desired material, such as oil or gas, to flow into the well bore. A water-in-oil microemulsion containing a breaker as well treatment agent is useful for the slow release of the breaker upon the completion of stimulation. Similarly, an oil-in water microemulsion containing a hydrocarbon based breaker as well treatment agent is useful for slow release of the breaker for viscoelastic surfactant based fluid upon the completion of stimulation. Timing of the release of the well treatment agent is important since if the chemical activity of the breaker is released too quickly, the viscous fluid will break and not perform the needed function. If the chemical activity is released too slowly or not totally the fluid will be too viscous and flow of oil or gas will be reduced from the formation.

Typically, the breaker is an oxidative breaker or enzymatic breaker including encapsulated oxidative breakers and encapsulated enzymatic breakers.

Examples of oxidative breakers include persulfates (such as alkaline earth metal and ammonium persulfates), percarbonates (such as alkaline earth metal percarbonates), perborates (such as alkaline earth metal perborates), peroxides (such as alkaline earth metal peroxides and zinc salts of peroxides), perphosphates, permanganates, etc. In addition materials, such as esters, which are capable of assisting the breaker in degrading the viscous fluid, may also be used in the microemulsion. Suitable esters include phenyl esters, alkylphenyl esters, $C_1$-$C_{11}$ alkyl esters, $C_1$-$C_{11}$ substituted alkyl esters, substituted phenyl esters and further include diesters, triesters, etc.

Examples of suitable enzymatic breakers are guar specific enzymes, alpha and beta amylases, amyloglucosidase, oligoglucosidase, invertase, maltase, cellulase, and hemi-cellulase as well mannanohydrolase enzymes including those disclosed in U.S. Pat. Nos. 5,806,597 and 5,067,566, herein incorporated by reference.

When used in stimulation, the microemulsions may be present in the fluid containing viscosifying agent, proppant, water, salt brine, and slickwater, foam, and liquid gas as well any other additive conventionally employed in stimulation fluids.

When incorporated into microemulsions for use with stimulation fluids, the amount of well treatment agent in the microemulsions is typically between from about 0.05 to about 5 (preferably from about 0.1 to about 2) weight percent based upon the total weight of the microemulsion.

The microemulsions may further be used for breaking filter cakes deposited by a drilling fluid, drill-in fluid, fluid loss control pill, etc. For instance, when used to break apart the filter cake formed from drilling operations, the microemulsion containing the well treatment agent may be injected into the wellbore through the drill string. Typically, the microemulsion is a component of the drilling fluid; the activity of the well treatment agent being delayed until it is desirable to degrade the filter cake.

Further, the microemulsion may be useful in controlling the release of well treatment agents which present compatibility issues to fluids being introduced into the wellbore and/or subterranean formation. For instance, where the well treatment agent may adversely affect the activity imparted by a fluid component which is needed for an operation prior to the activity offered by the well treatment agent, it may be beneficial to include the well treatment agent in the microemulsion. For instance, in some cases, such as with a fluid loss pill, it is beneficial for the viscosity of the fluid to increase prior to the breaking of the fluid. To avoid the premature action of the breaker, it may be beneficial to include the breaker in the microemulsion to decrease the possibility of adverse affects imparted by the breaker and to maximize the affect of the breaker when the breaker is needed. The microemulsion further prevents destabilization or other changes to the treatment fluid until the desired effect imparted by the well treatment agent is to occur.

The following examples are illustrative of some of the embodiments of the present invention. All percentages are in volume percent unless otherwise indicated. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

Example 1

The release rate of water-in-oil microemulsions containing a beta-mannanase enzyme, commercially available as GBW-12CD from Baker Hughes Incorporated; Enzyme G, a breaker for guar based fluids, commercially available from Baker Hughes Incorporated and a hemicellulase, commercially available as Enzyme GBW-15C from Baker Hughes Incorporated were compared to aqueous fluids containing the same enzymes. The tests were conducted using the same concentrations at the same temperatures in order to demonstrate the effect of the well treatment agent in the water-in-oil microemulsion compared to the well treatment agent in an aqueous fluid. The oil phase of the microemulsion consisted of about 56% by volume of a surfactant mixture of polyoxyethylene sorbitan monopalmitate and ethoxylated castor oil and about 34% by volume d-limonene. The microemulsions contained 6% Enzyme G, 8% Enzyme GBW-15C. Water solutions containing 6% Enzyme G and 8% Enzyme GBW-15C were also prepared.

The linear gel was prepared from aqueous slurry containing 4 lbs guar polymer, oleophilic clay and a surfactant. One liter of the slurry was hydrated for 30 minutes using a standard Servodyne mixer with a high-efficiency paddle at 1500 rpm to render a 40 lb. linear gel. Base gel viscosity was measured on an OFITE M900, available from the OFI Testing Equipment, Inc., using a R1B1 rotor-bob configuration @511 s-1. In the OFITE M900 testing, the fluid was initially sheared at 60 $\sec^{-1}$ followed by a shear rate sweep of 60, 100, and 300 $s^{-1}$ to calculate the power law indices n' and K'. The fluid was sheared at 60 $s^{-1}$ in between shear rate sweeps, and the shear rate sweep was repeated every 5 minutes for 3 hours. A R1B1 rotor-bob configuration was used.

Results of OFITE rheology testing for the 40 lb. GLFC-5D linear gel with microemulsion/Enzyme G fluid and water/Enzyme G fluid at 75° F. are shown in FIG. 1. (The baseline in the figures represents the fluid without the enzyme breaker.) All linear gels containing the enzymes showed a decrease in viscosity over time. The fluid containing 1.0 gpt of microemulsion/6% Enzyme G fluid showed a smaller rate of decrease in the viscosity than with the fluid containing the 1.0 gpt of water/6% Enzyme G fluid. This indicates that the microemulsion product is delaying the enzyme release.

Figure 2:
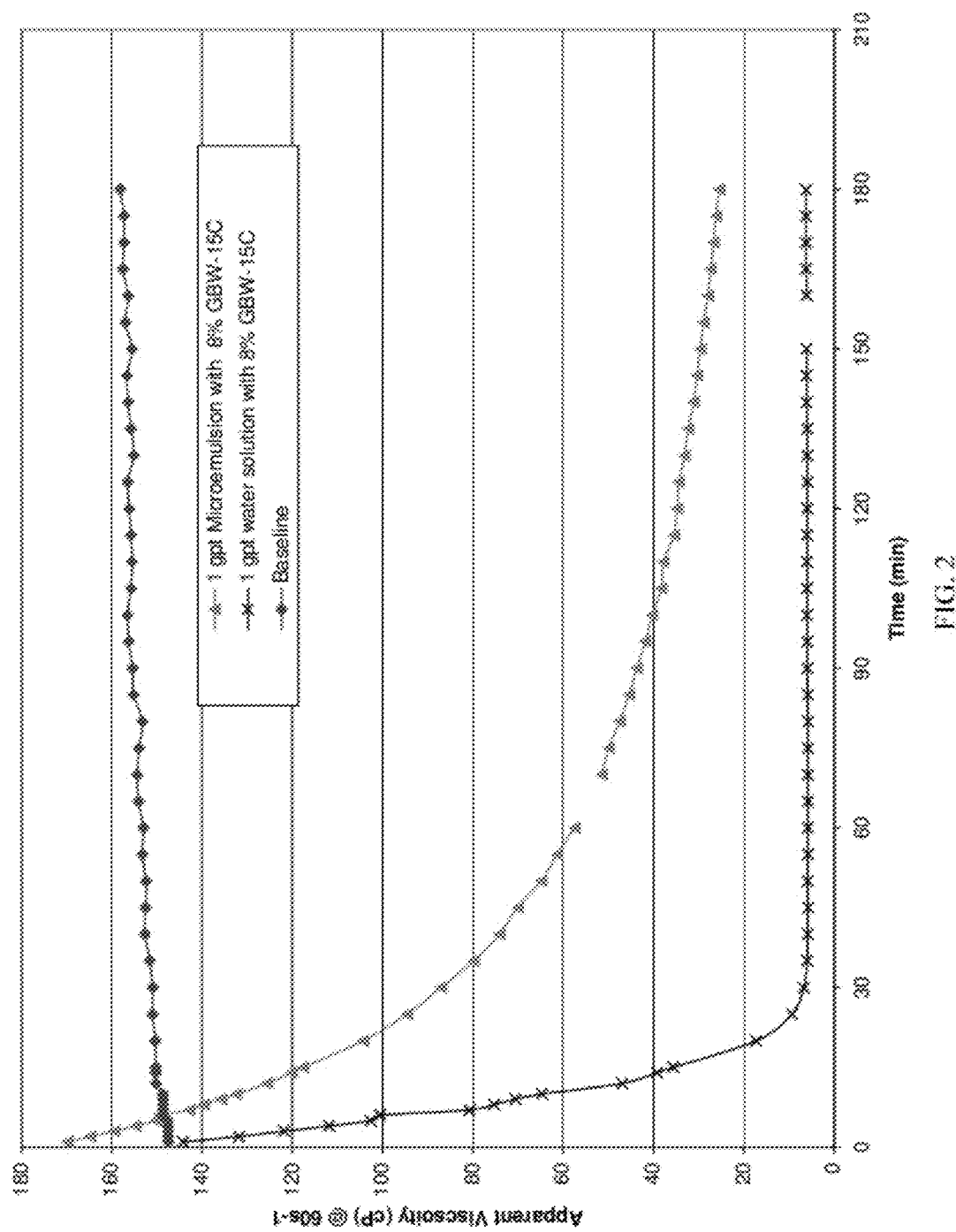
FIG. 2 compares the apparent viscosity at 75° F. of a linear gel having 8% by volume enzyme incorporated in a water-in-oil microemulsion versus a linear gel having 8% by volume enzyme within an aqueous fluid.

Results of OFITE rheology testing for the 40 lb. GLFC-5D linear gel with microemulsion/8% Enzyme GBW-15C fluid and water/8% Enzyme GBW-15C fluid at 75° F. are shown in FIG. 2.

Figure 3:
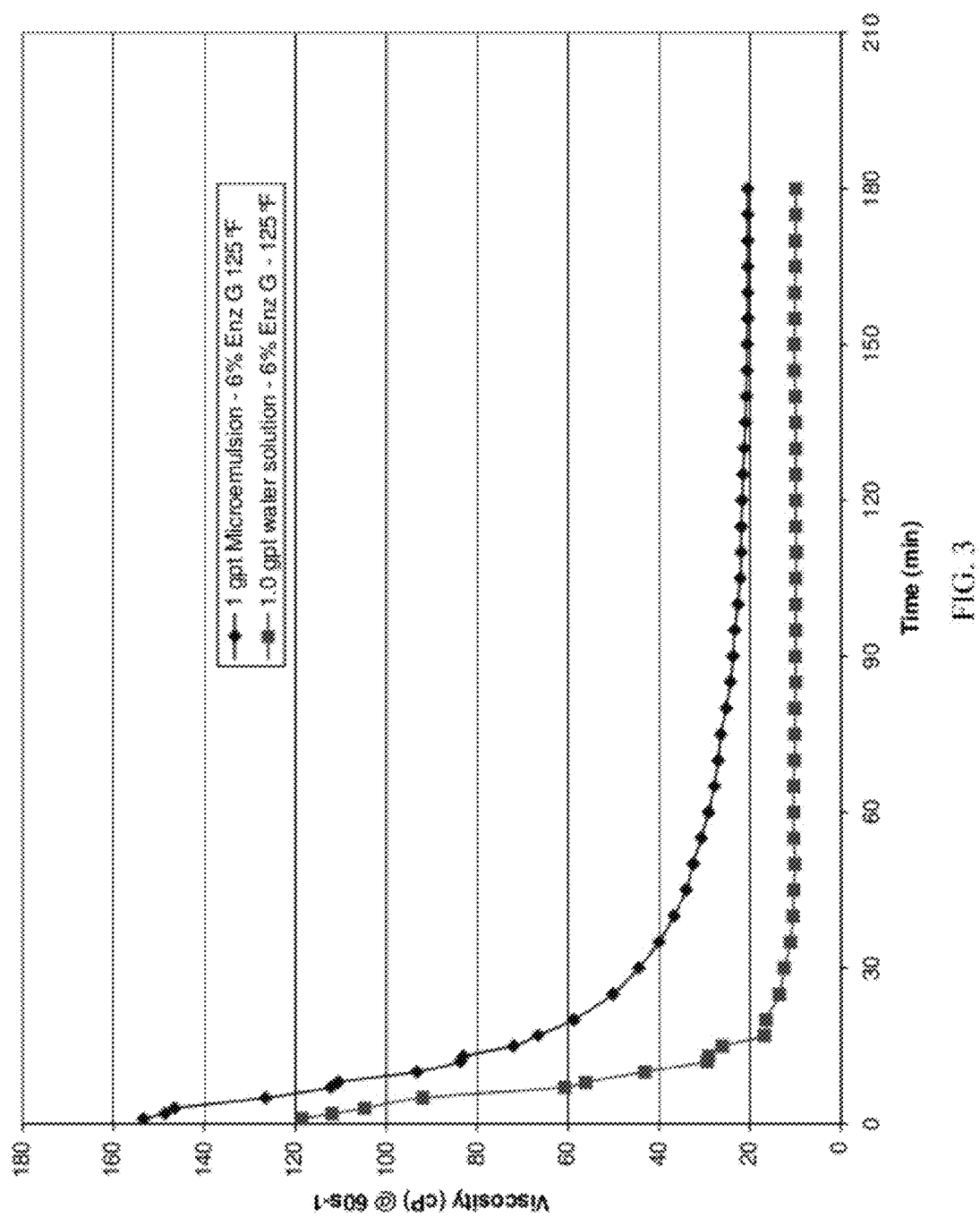
FIG. 3 compares the apparent viscosity at 125° F. of a linear gel having 6% by volume enzyme incorporated in a water-in-oil microemulsion versus a linear gel having 6% by volume enzyme within an aqueous fluid.
Figure 4:
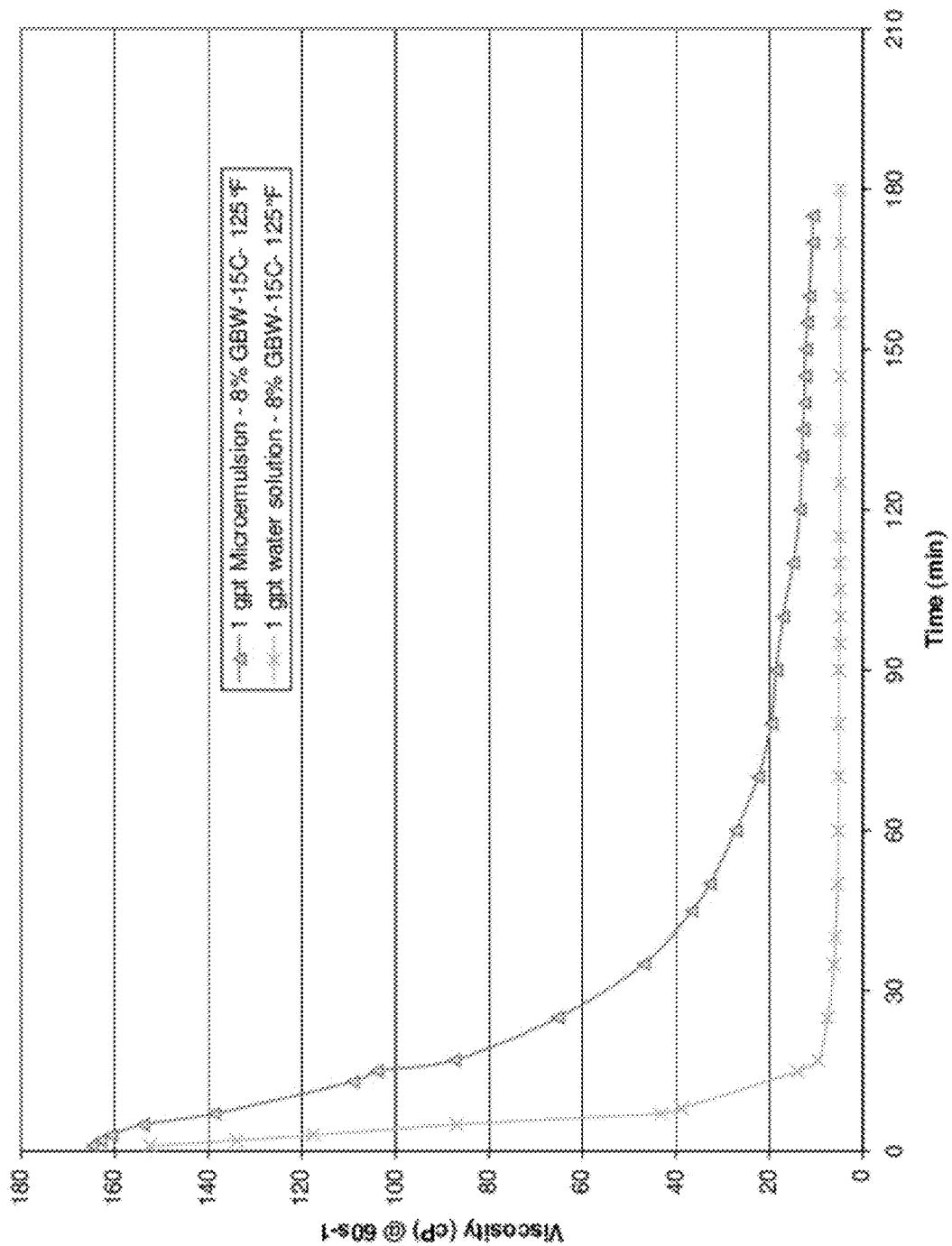
FIG. 4 compares the apparent viscosity at 125° F. of a linear gel having 8% by volume enzyme incorporated in a water-in-oil microemulsion versus a linear gel having 8% by volume enzyme within an aqueous fluid.

Results of OFITE rheology testing for the 40 lb. GLFC-5D linear gel with microemulsion/8% Enzyme GBW-15C fluid and water/8% Enzyme GBW-15C fluid at 125° F. are shown in FIG. 3. Results of OFITE rheology testing for the 40 lb. GLFC-5D linear gel with microemulsion/8% Enzyme GBW-15C fluid and water/8% Enzyme GBW-15C fluid at 125° F. are shown in FIG. 4. In both cases the fluid containing 1.0 gpt of microemulsion/Enzyme fluid showed a smaller rate of decrease in the viscosity than with the fluid containing the 1.0 gpt of water/Enzyme fluid. This indicates that the microemulsion product is delaying the enzyme release.

Figure 5:
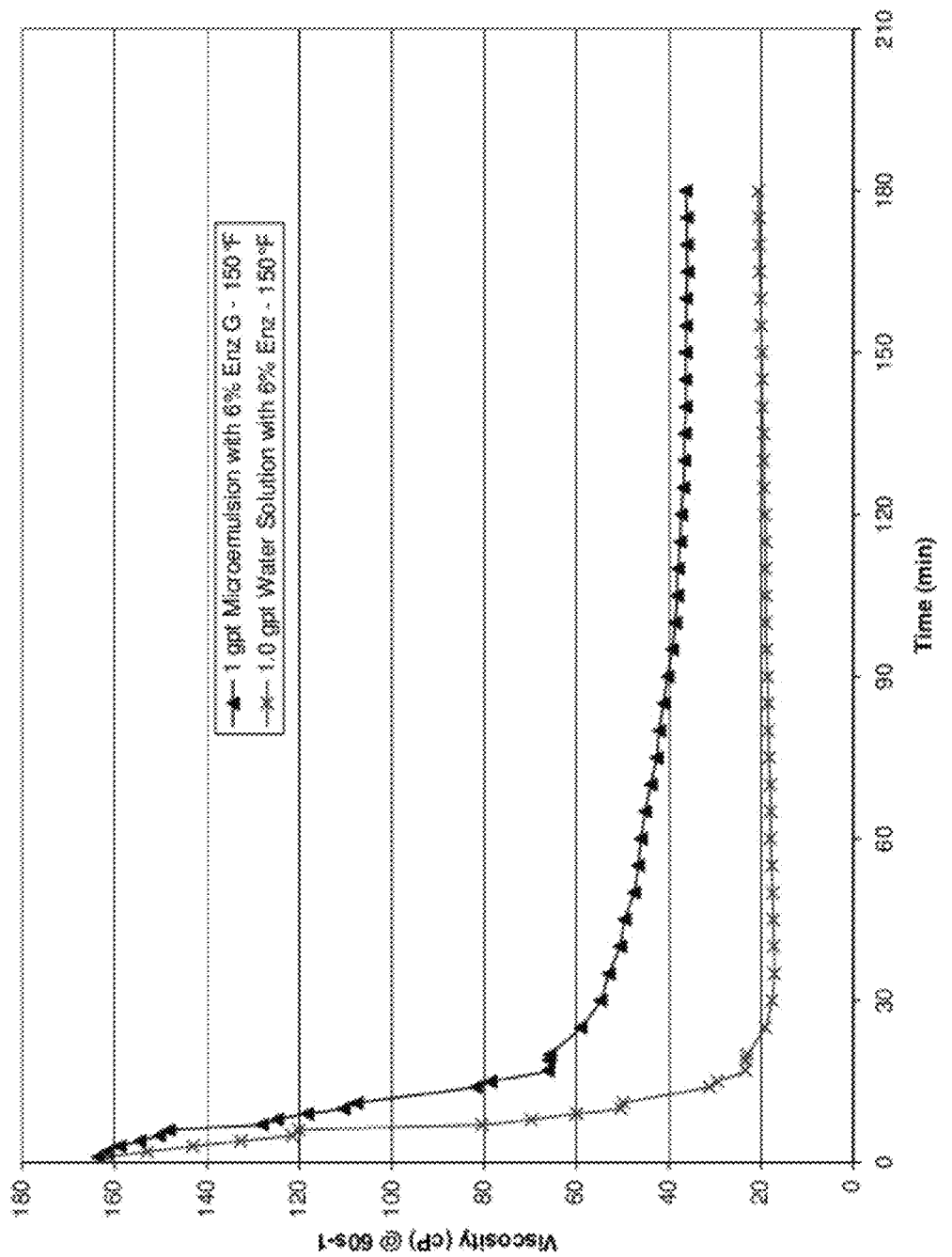
FIG. 5 compares the apparent viscosity at 150° F. of a linear gel having 6% by volume enzyme incorporated in a water-in-oil microemulsion versus a linear gel having 6% by volume enzyme within an aqueous fluid.
Figure 6:
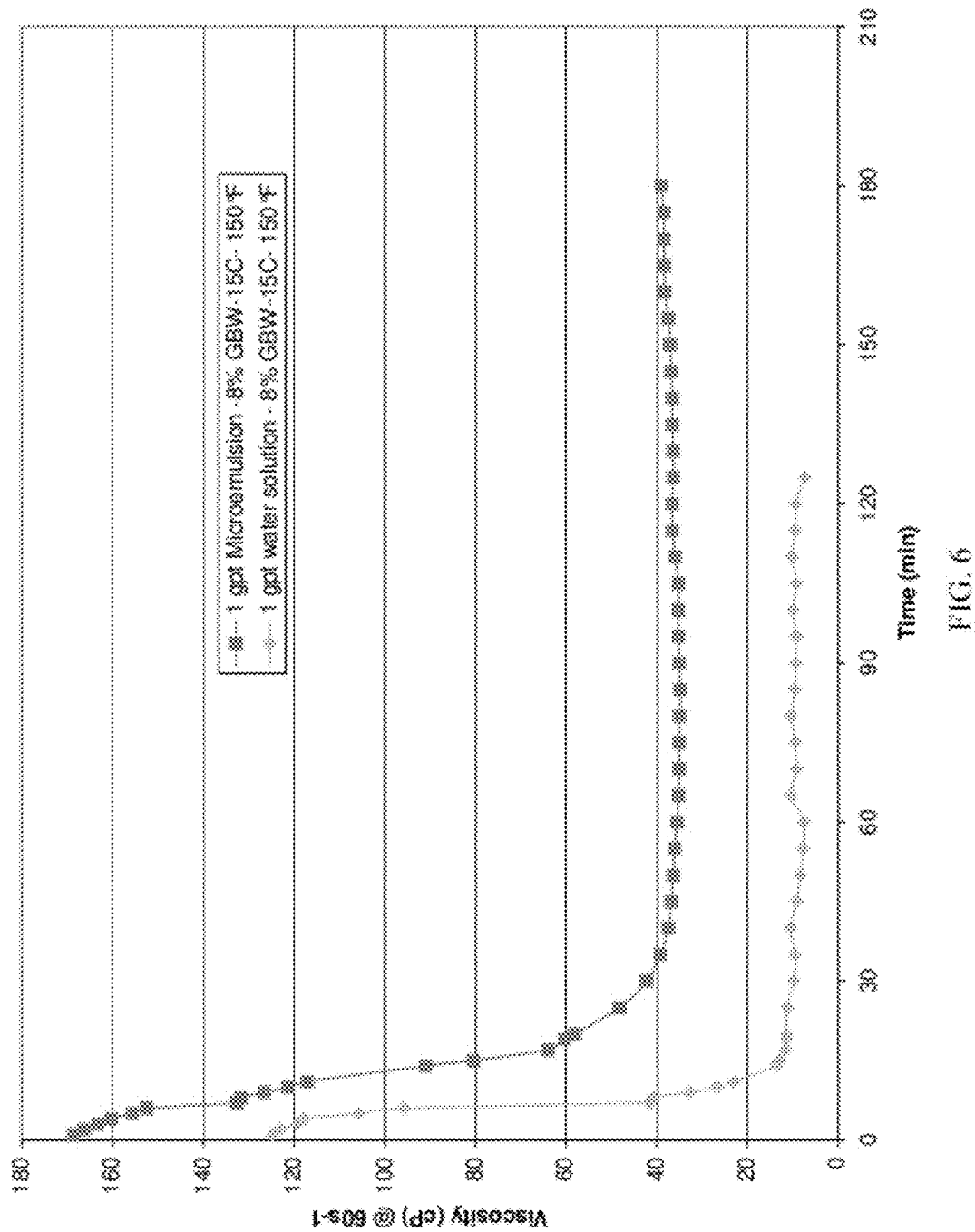
FIG. 6 compares the apparent viscosity at 150° F. of a linear gel having 8% by volume enzyme incorporated in a water-in-oil microemulsion versus a linear gel having 8% by volume enzyme within an aqueous fluid.

FIGS. 5 and 6 show the test results at 150° F. Again the fluid containing 1.0 gpt of microemulsion/Enzyme fluid showed a smaller rate of decrease in the viscosity than with the fluid containing the 1.0 gpt of water/Enzyme fluid. This indicates that the microemulsion product is delaying the enzyme release.

Referring to FIGS. 1-6, the data shows the delay of the activity on two different enzymes by incorporating the enzyme or diluted enzyme in water into the internal phase of the microemulsion. Results show that at 75° F., 125° F. and 150° F. the enzyme microemulsion has slower release than the same concentration of enzyme in an aqueous solution.

The Examples illustrate that incorporation of the enzyme/dilute enzyme in a water-in-oil microemulsion delays the release of the enzyme in a fracturing fluid. In particular, the data demonstrates that at 75° F., 125° F. and 150° F. the fluid containing 1.0 gpt of microemulsion/6% Enzyme G fluid showed a smaller rate of decrease in the viscosity than with the fluid containing the 1.0 gpt of water/6% Enzyme G fluid. This indicates that the microemulsion product delayed enzyme release and that fluid containing 1.0 gpt of microemulsion/8% Enzyme GBW-15C fluid showed a smaller rate of decrease in the viscosity than with the fluid containing the 1.0 gpt of water/8% Enzyme GBW-15C fluid. This indicates that the microemulsion product delayed enzyme release.

From the foregoing, it will be observed that numerous variations and modifications may be effected without departing from the true spirit and scope of the novel concepts of the invention.

What is claimed is:

1. A method of inhibiting or controlling release of a well treatment agent in a well, a subterranean formation, a flow conduit or a vessel by introducing into the well, subterranean formation, flow conduit or vessel the well treatment agent in a water-in-oil microemulsion, wherein (a) the water-in-oil microemulsion provides for continuous release of the well treatment agent over a sustained period of time of at least six months; (b) the oil phase of the water-in-oil microemulsion is a solvent-surfactant blend; and (c) the amount of surfactant in the blend is from about 35 to about 80% by volume.

2. The method of claim 1, wherein the water-in-oil microemulsion is introduced into a gas well, oil well or geothermal well.

3. The method of claim 1, wherein the microemulsion has an oil phase comprising a solvent selected from the group consisting of unsaturated aliphatic cyclic hydrocarbons, a surfactant having an HLB value between from about 8 to about 18, and a $C_1$-$C_{20}$ alcohol or glycol.

4. The method of claim 3, wherein the surfactant is selected from the group consisting of polyoxyethylene sorbitan monopalmitate, polyoxyethylene sorbitan monostearate, polyoxyethylene sorbitan monooleate, linear alcohol alkoxylates, alkyl ether sulfates, dodecylbenzene sulfonic acid (DDBSA), linear nonyl-phenols, dioxane, ethylene oxide, ethoxylated castor oils and mixtures thereof.

5. The method of claim 3, wherein the water-in-oil microemulsion further contains an alcohol, a glycol or a mixture thereof.

6. The method of claim 5, wherein the alcohol or glycol is selected from the group consisting of isopropanol, t-butanol, n-butanol, n-pentanol, n-hexanol, 2-ethyl-hexanol, ethylene glycol, polyethylene glycol, propylene glycol, triethylene glycol and mixtures thereof.

7. The method of claim 1, wherein the microemulsion has an oil phase comprising a solvent of either a terpene or an alkyl, cyclic or aryl acid ester of a short chain alcohol or a mixture thereof.

8. The method of claim 7, wherein the terpene is a monoterpene, a diterpene or a mixture thereof.

9. The method of claim 6, wherein the monoterpene is d-limonene.

10. The method of claim 7, wherein the solvent is an alkyl, cyclic or aryl acid ester or a mixture thereof.

11. The method of claim 1, wherein the well treatment agent is at least one member selected from the group consisting of scale inhibitors, salt inhibitors, paraffin inhibitors, demulsifying agents, gas hydrate inhibitors, pH adjustment agents, corrosion inhibitors, asphaltene inhibitors, crosslinking agents, crosslinking delaying agents, oxygen scavengers, biocides, breakers, buffers, acids and esters.

12. The method of claim 1, wherein the well treatment agent has a particle size between from about 0.001 to about 100 microns.

13. The method of claim 1, wherein the microemulsion has an oil phase selected from the group consisting of diesel, kerosene, crude oil, condensate, synthetic oils, an ester, linear-α-olefins, poly-α-olefins, paraffins, linear alkyl benzenes, esters, acetals and mixtures thereof.

14. The method of claim 1, wherein the amount of well treatment agent in the water-in-oil microemulsion is between from about 2 to about 20 weight percent.

15. The method of claim 1, wherein a well treatment fluid contains the water-in-oil microemulsion and further wherein the amount of water-in-oil microemulsion in the well treatment fluid is between from about 15 ppm to about 100,000 ppm.

16. The method of claim 1, wherein the water-in-oil microemulsion is introduced into the well or formation with a treatment fluid selected from the group consisting of stimulation fluids, drilling fluids, drill-in fluids, completion fluids and fluid loss control pills.

17. The method of claim 16, wherein the treatment fluid is injected directly into the well through a delivery tube and removes fines, asphaltenes, paraffins or water blocks or a combination thereof formed during treatment of the well.

18. The method of claim 1, wherein the water-in-oil microemulsion provides for continuous release of the well treatment agent introduced into the well up to three years.

* * * * *